3,210,303
RESIN BONDED FRICTION COMPOSITION PRODUCT AND METHOD

Robert W. Biggs, Shaker Heights, Ohio, assignor, by mesne assignments, to American Brake Shoe Company, New York, N.Y., a corporation of Delaware
No Drawing. Filed Sept. 26, 1960, Ser. No. 58,577
5 Claims. (Cl. 260—19)

My invention generally relates to improvements in resin bonded friction material and has particularly significance in connection with a pressed and bonded material which is predominantly metallic and useful as a friction facing adapted to engage a relatively movable metallic element for vehicular use.

I find that friction materials used for facings in brakes, clutches, automatic transmissions and the like, must be selected and compounded with many factors in mind if customer acceptance and satisfactory operation are to be assured. These factors include high coefficient of friction, low wear of the facing and of the surface which it engages, absence of "fading" (by which is meant a decrease of coefficient of friction, for example, due to a rapid succession of high speed engagements), quietness of operation of the material, freedom from "grabbing" and erratic operation, strength of the facing against ruptures, and relatively low cost of the materials and of their compounding.

Particularly for passenger car brake and clutch applications, there has long been a search for a satisfactory friction material. For many years various formulations for predominantly metallic friction facings made from powders have been used for heavy duty applications such as in trucks, busses, military vehicles, airplanes, and industrial machinery, but such facings have not heretofore met all of the economic and other requirements for a satisfactory friction material for many pleasure car applications.

It is an object of my invention to provide a novel friction material which satisfies requirements set out above.

Other objects and advantages will become apparent and the invention may be better understood from consideration of the following description.

Typical of a predominantly metallic friction facing as heretofore known is that described and claimed in U.S. Patent No. 2,863,211 issued December 9, 1958 on an application filed by Samuel K. Wellman in 1955 and which contains one metallic powder (iron) and one non-metallic powder (graphite) with the iron in such quantity (e.g., about 80% by weight) as to provide a substantially continuous network or matrix and the graphite in such quantity (e.g., at least 15% of the mix by weight) as to form a continuous film upon mating engagement with another part. In that mix iron was used as the base material both to provide strength and to act as a friction producing agent and graphite in excess of 15% was added for its lubricating properties and to reduce wear. According to the then prevailing art these materials are powdered, then measured by weight and mixed as in a blender, then cold compacted under a pressure on the order of 12.5 tons per square inch, and then sintered at 1800° F. while under a pressure of 250 p.s.i.

One Elerath, in his U.S. Patent 2,110,571 filed in 1936, suggested a resin bonded friction lining one step molded at 10,000 p.s.i. at 305° F., while Walker in an application filed in 1940 which matured as U.S. Patent 2,369,502 suggested a resin bonded friction material pressed at 3500 p.s.i. and cured. To my knowledge these compositions have not been found useful for passenger car brake linings.

By contrast, I have found that an improved friction composition product particularly useful for passenger car brake linings may be made by using a high pressure compacted low temperature low pressure cured mix comprising powdered iron as a base, synthetic resin as a bond, and a very high graphite content, for example 23% by weight powdered graphite. Other additives useful for certain purposes are later described herein.

Good results have been obtained using 68% powdered iron, 23% powdered graphite, 9% powdered synthetic resin such as phenol formaldehyde thermosetting resin.

The iron is substantially pure (preferably) and dry, and dry artificial graphite is preferred. Particle size of all the materials was found to be important to give good compact strength, a mix comprising iron powder having a majority passing through a 20 mesh screen (Tyler Standard) and remaining on an 80 mesh screen, graphite powder having a majority passing through a 40 mesh screen and remaining on an 80 mesh screen, and the resin being either a liquid (for example sprayed on the metal particles) or a powder for example 90% through a 325 mesh screen, giving good compact strength.

The ingredients are first mixed as in a blender. As little as 55% iron (by weight) may be used, as will later be apparent from adding maximal quantities of the other ingredients. As much as 90% iron may be used, as will be apparent from adding maximal quantities of the other necessary ingredients.

The graphite should be at least 5% (to prevent high wear) and not more than 30% (from a structural strength standpoint and also in order to not affect friction properties adversely). Preferably the graphite range (by weight of the mix) is 13 to 25%, most desirably 22 to 24%, although 18% may be most desirable in special cases one of which is described hereinafter.

To some extent the resin itself acts like graphite to prevent excessive wear, but the total of the two components together should be at least 10% of the mix and preferably 15%.

For the resin, the thermosetting phenol formaldehyde resins known under the trademarks "Durez 13848" (thermosetting phenol formaldehyde resin of two-step type) and "Bakelite BRP 8880" (modified phenolic resin of two-step type) have given excellent results. So, also, have the thermosetting polyester resins, for example, that known under the trademark "Atlac Grade 363E" (polyester alkyd resin). Moreover, the thermosetting melamines, for example, the one known under the trade mark "CYMEL 405" melamine resin. See U.S. Patent 2,260,239), can also be used.

Strength and also hardness of the friction composition is apt to change with increase of resin content above about 15% by weight of the mix and I have found that strength decreases with decrease of resin content in the lower ranges below 9% especially below 7% and more particularly below 5%.

Strength of the final friction product is affected by compacting pressure. Using a two step process with a high pressure during initial compacting, but with the application of a lower pressure during curing reduces the outlay for capital equipment (by eliminating high pressure processing equipment in a furnace). This is not essential (except for one aspect of the invention which relates to cost reduction) and the high initial pressure may be the final pressure (during curing) but I have found that it is essential to have some high pressure compacting, by which I mean a pressure greater than 9 TSI (18,000 p.s.i.), more particularly greater than 10 TSI (20,000 p.s.i.), and most desirably more than 18 TSI (36,000 p.s.i.) in order to give a proper article particularly as regards transverse rupture strength which is an important consideration in the manufacture of friction facings. Those in the art recognize that transverse rupture or matrix strength is a good indication of how well the material will stand up in service without deteriorating or crumbling or otherwise failing structurally during use, and field tests have indicated that at least 4,000 p.s.i. transverse rupture strength is necessary to prevent fracture of friction facings in severe service. For a mix in accordance with the present invention this transverse rupture strength requirement is satisfied by using a relatively high compacting pressure as compared to the prior art, that is, above 10 TSI, or most desirably above 18 TSI, and this high pressure permits the friction article to have a high content of graphite (to reduce wear) or of other friction tailoring agent and still be within minimum strength requirements.

Strength of the final friction product is also affected by the time length and temperature and pressure of cure. 350° F. for 60 minutes, and 400°–450° F. (depending on resin used) for 60 seconds, were found to be optimum combinations for curing. Temperatures in excess of 650° F. (way below usual sintering temperatures such as 1800° F.) result in decomposition of the plastic. Satisfactory pressure during curing was found from 100 to 650 p.s.i., but, of course, only if there was a prior high initial pressure.

While the iron, high graphite and resin mix alone is satisfactory in some instances (e.g., for brakes on one United States make of car where the brakes are so large that lower frictional values are used), in other instances a higher coefficient of friction is desired and is obtained by adding a percentage of an abrasive grit such as silica or, preferably, a higher melting point refractory, most desirably 4% zircon (ZrSiO$_4$) or 0.8% alumina (Al$_2$O$_3$).

Another desirable additive is 0.2% stearic acid useful to prevent mold sticking.

A preferred composition for a friction facing in accordance with the present invention is:

| | Percent |
|---|---|
| Powdered iron | 63.8 |
| Powdered graphite | 23 |
| Powdered phenol formaldehyde resin | 9 |
| Stearic acid | 0.2 |
| ZrSiO$_4$ | 4 |

In the art sometimes it is desired to use different coefficient of friction materials in the same application, for example with one material in end segments of a brake shoe and the other material used as a center segment, or with the different materials on different shoes contacting the same brake drum. For such use two preferred mixes in accordance with my invention are:

One material (for high coefficient of friction):

| | Percent |
|---|---|
| Fe | 72 |
| Graphite | 18 |
| Resin | 9 |
| Al$_2$O$_3$ | 0.8 |
| Stearic acid | 0.2 |

Other material (for lower wear):

| | Percent |
|---|---|
| Fe | 67.8 |
| Graphite | 23 |
| Resin | 9 |
| Stearic acid | 0.2 |

While resin bonded friction facings have long been known, they have heretofore not been entirely satisfactory from the standpoint of wear, noise and frictional characteristics. To a lesser extent the same has been true of the sintered (at about 1800° F.) predominantly metallic mixes which have had further disadvantages due to high cost of processing. Also heretofore the sintered metallics have often shown too much coefficient of friction build-up (e.g., increase with decreasing speed during one stop) and prior resin bonded mixes, most always containing a material such as asbestos, have shown the opposite, that is too much "fade" in coefficient of friction during one or many stops. I have found that the way to get the best charcteristics of both is not to combine lead or zinc or copper or other metal with asbestos, but to combine iron and more than 13% graphite with a resin bonding agent and then bond and cure the same with such pressure and temperature processing as has been described. This gives improved friction characteristics plus a substantial saving in cost in manufacturing techniques so as to overcome the prior principal drawback of high cost and lack of stability of friction level. When used for passenger car brake linings, the product of the invention has proved better than prior sintered material in build-up and in cost. Also it has proved better than the prior art asbestos containing linings in improving wear, noise, fade and other operating characteristics (while equal thereto in cost).

While I have described a particular embodiment, various modifications may obviously be made without departing from the true spirit and scope of the present invention as defined in the accompanying claims taken with all reasonable equivalents.

I claim:

1. Friction facing composition product for brakes, clutches, automatic transmissions, and the like having low wear, low fade and high structural strength and comprising a pressed and resin bonded mixture substantially free of asbestos and essentially consisting of 55% to 90% iron, 5% to 30% graphite, and more than 5% up to about 15% cured thermosetting phenol formaldehyde resin bonding agent.

2. Friction composition product for brakes, clutches, automatic transmissions and the like characterized by low wear and high structural strength and consisting essentially of pressed and bonded mixture of 60% to 80% iron, 13% to 25% graphite, 7% to 15% cured thermosetting phenol formaldeyhde resin.

3. A bonded and cured friction facing composition product having low wear and high structural strength initially consisting essentially of about 68% powdered iron, about 23% powdered graphite, about 9% powdered thermosetting phenol formaldehyde resin, up to about 4% ingredient of the group consisting of zircon, silica and alumina.

4. A high coefficient of friction material characterized by low wear and high structural strength comprising a bonded and cured mixture initially consisting essentially of about 72% powdered iron, about 18% powdered graphite, about 9% powdered thermosetting phenol formaldehyde resin, about 0.8% alumina, and about 0.2% stearic acid.

5. A friction material which is characterized by high strength and low wear comprising a bonded and cured mixture initially consisting essentially of about 66% to 68% iron, about 23% graphite, about 9% thermosetting phenol formaldehyde resin, about 0.2% stearic acid, and 0% to about 1.5% friction producing agent in the form of an abrasive grit.

References Cited by the Examiner

UNITED STATES PATENTS

| | | | |
|---|---|---|---|
| 1,969,041 | 8/34 | Seabury et al. | 260—38 |
| 2,159,935 | 5/39 | Sanders | 260—38 |
| 2,162,600 | 6/39 | Ball | 51—298 |
| 2,369,502 | 2/45 | Walker. | |
| 2,686,140 | 8/54 | De Gaugue | 260—38 |
| 2,881,065 | 4/59 | Reuter | 51—298 |
| 2,910,449 | 10/59 | Evans | 260—38 |
| 2,978,850 | 4/61 | Gleaszer | 51—298 |
| 3,062,633 | 11/62 | Coes | 51—298 |

LEON J. BERCOVITZ, *Primary Examiner.*

ALPHONSO D. SULLIVAN, MILTON STERMAN,
*Examiners.*